Oct. 7, 1969     D. W. RISK     3,471,119

BALL VALVE

Filed March 31, 1967     2 Sheets-Sheet 1

DANIEL W. RISK
INVENTOR.

BY Warren T. Jessup
ATTORNEY

Oct. 7, 1969   D. W. RISK   3,471,119
BALL VALVE
Filed March 31, 1967   2 Sheets-Sheet 2
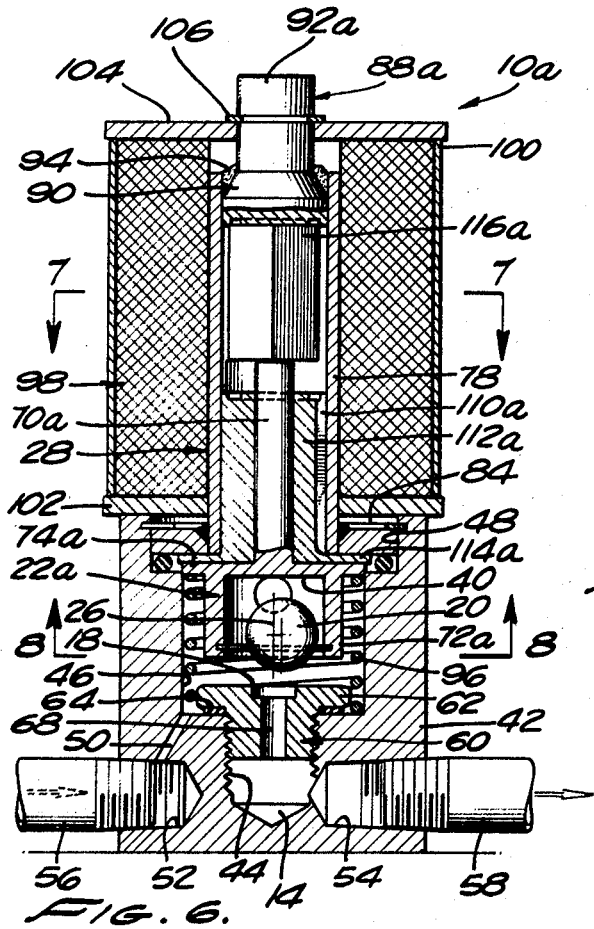
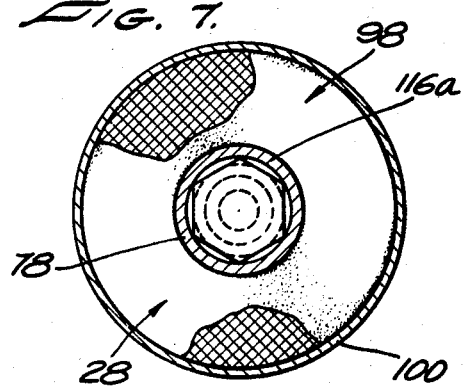
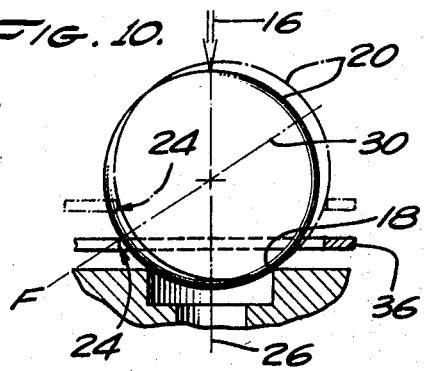
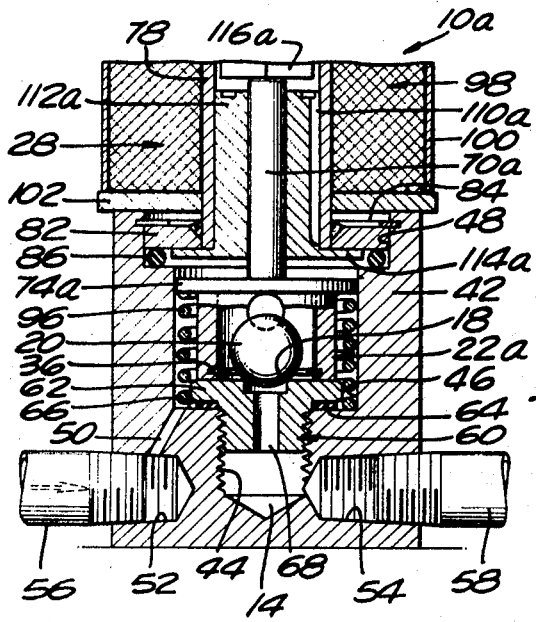
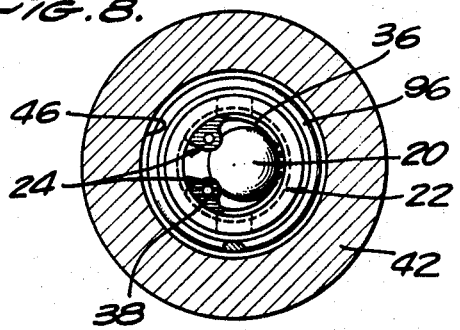
DANIEL W. RISK
INVENTOR.
BY Warren T. Jessup
ATTORNEY United States Patent Office 3,471,119
Patented Oct. 7, 1969

3,471,119
BALL VALVE
Daniel W. Risk, Los Angeles, Calif., assignor to Coast Elevator Company, Los Angeles, Calif., a corporation of California
Filed Mar. 31, 1967, Ser. No. 676,366
Int. Cl. F16k 25/00, 31/44
U.S. Cl. 251—84                                    10 Claims

ABSTRACT OF THE DISCLOSURE

A ball valve having a valve lifter movable longitudinally in the valve passage upstream of the valve seat and an asymmetrical valve ball lifting shoulder on the valve lifter between the valve ball and valve seat which engages the ball at one side of the valve seat axis during movement of the valve lifter away from the valve seat to exert on the valve ball an unseating force directed along a line of action inclined at an acute angle relative to the axis in such a way that the force is effective to both axially lift and laterally roll the ball from the seat, thereby to substantially reduce the magnitude of the force required to unseat the ball against any given fluid pressure.

BACKGROUND OF THE INVENTION

Field of invention

This invention relates generally to flow control valves. More particularly, the invention relates to improvements in floating ball valves.

Prior art

Generally speaking, the existing floating ball valves may be characterized as shutoff valves, check valves, and combination shutoff and check valves. A ball shutoff valve has a valve ball which opens against fluid pressure and manual or power means for effecting movement of the valve ball between its open and closed positions. A ball check valve has a valve ball which opens in response to flow in one direction through the valve passage and closes in response to reverse flow through the passage, thus to permit flow in only one direction through the passage. A combination ball valve serves the dual function of a shutoff valve and a check valve. As will appear from the ensuing description, the present improved ball valve is inherently capable of use as a shutoff valve, a check valve, and a combination valve. However, the improvements contributed by the invention are concerned with operation of the valve as a shutoff valve and, more specifically, with reducing the lifting force required to unseat the valve ball against pressure. For this reason the following description relates primarily to use of the present valve as a ball shutoff valve.

In most existing floating ball shutoff valves, hereinafter referred to simply as a ball valve, the lifting force exerted on the valve ball to unseat the ball from its valve seat against pressure is directed along a line of action which parallels the axis of the seat and extends normal to a plane containing the annular zone of contact between the ball and seat. As a consequence, the unseating or opening movement of the ball occurs along the axis of the valve seat and the ball separates from the seat uniformly about the entire circumference of the seat. The magnitude of the force required to unseat the ball is equal to the product of the fluid pressure active on the ball and effective area of the valve seat, i.e., the circular area enclosed by the annular zone of contact of the ball and seat. Depending upon the pressure of the fluid being controlled and the effective area of the valve seat, this unseating force may be relatively large. It is desirable, of course, to keep the valve ball unseating force as small as possible in order to minimize the effort required to open the valve against fluid pressure. A minimum unseating force is particularly desirable or essential in solenoid actuated shutoff valves.

Some existing ball valves have means for unseating the valve ball with a lateral rolling action. Prior Patents Nos. 1,992,490 and 2,096,808 disclose valves of this type. These existing roll-action valves, however, are not totally satisfactory. By way of example, the valve lifters in the patented valves just referred to act along direction lines transverse to the valve axis which is undesirable from the standpoints of overall valve size and symmetry, particularly if the valve is solenoid operated.

SUMMARY OF THE INVENTION

It is a general object of this invention to provide an improved ball valve characterized by a valve ball unseating force at any given pressure which is relatively small in comparison to the unseating force required in conventional ball valves at the same pressure.

A more specific object of the invention is to provide an improved ball valve of the character described, having a valve ball lifter which moves axially of the valve seat and produces an unseating force on the valve ball directed along a line of action which is inclined at an acute angle relative to the axis of the valve seat in such a way that the force is effective to both axially lift and laterally roll the ball from the seat, whereby the magnitude of the force required to unseat the ball at any given pressure is minimized.

A further object of the invention is to provide an improved ball valve of the character described which is capable of solenoid actuation at relatively high fluid pressures.

Yet a further object of the invention is to provide an improved ball valve of the character described which is relatively simple in construction, reliable in operation, economical to manufacture, and is otherwise ideally suited to its intended purposes.

Other objects, advantages, and features of the invention will become readily apparent as the description proceeds.

With these and such other objects in view, the invention consists in the construction, arrangement, and combination of the various parts of the invention, whereby the objects contemplated are attained, as hereinafter set forth, pointed out in the appended claims, and illustrated in the accompanying drawings.

BRIEF DESCRIPTION OF THE DRAWINGS

FIGURE 6 is an axial section through a normally open solenoid operated ball valve according to the invention illustrating the valve in its normally open condition;

FIGURE 7 is a section taken on line 7—7 in FIGURE 6;

FIGURE 8 is a section taken on line 8—8 in FIGURE 6;

FIGURE 9 is a fragmentary section similar to the lower portion of FIGURE 6, illustrating the valve in its closed condition; and FIGURE 10 is an enlarged fragmentary view illustrating the axial lifting and lateral rolling force exerted on the valve ball during unseating thereof.

DESCRIPTION OF THE PREFERRED EMBODIMENT

Figure 1:
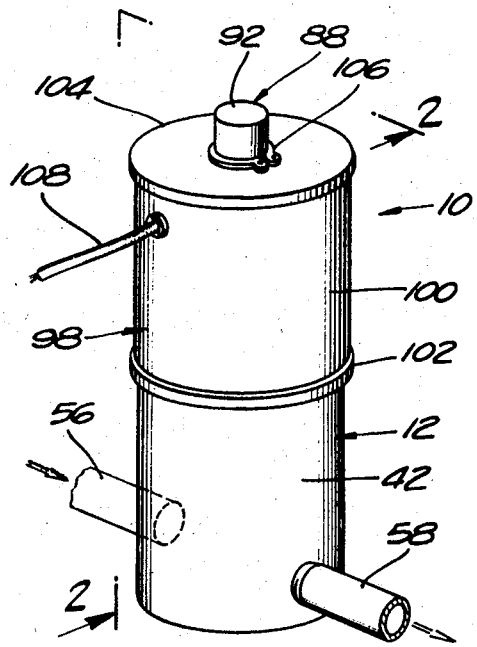
FIGURE 1 is a perspective view of a normally closed solenoid operated ball valve according to the invention.
Figure 3:
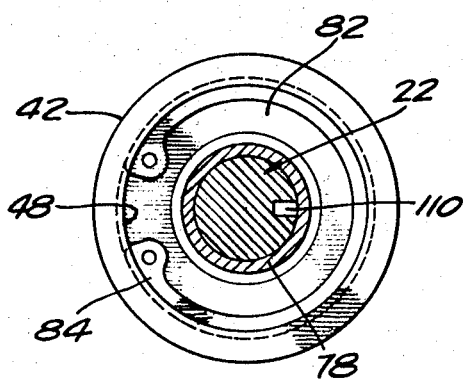
FIGURE 3 is a section taken on line 3—3 in FIGURE 2.
Figure 4:
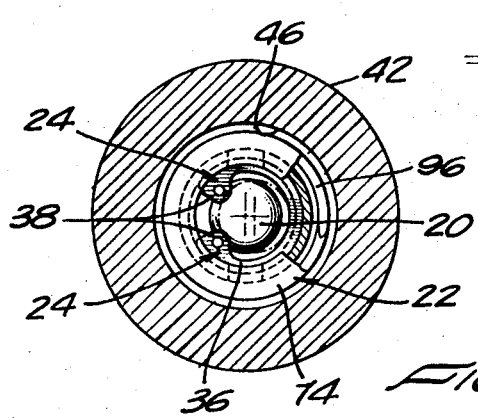
FIGURE 4 is a section taken on line 4—4 in FIGURE 2.

In general terms, the invention provides a ball valve, represented in FIGURES 1–5 of the drawings by the valve 10, having a housing 12 containing a fluid passage 14 for conducting fluid in a given direction of flow, indicated by the arrow 16, through the passage, and an annular valve seat 18 about the passage and facing upstream relative to the given flow direction. Within the passage 14, upstream of the valve seat 18, is a valve ball 20 having a diameter greater than the diameter of the seat. Fluid flow in the direction 16 through the passage thus urges the valve ball toward a position of seating engagement with the valve seat. Movable longitudinally in the passage 14, upstream of the valve seat 18, is a valve lifter 22 having an asymmetrical valve-ball-lifting thrust shoulder 24 located between the seat and the valve ball 20, at one side of the valve seat axis 26.

Operating means 28 are cooperatively associated with the valve lifter 22 for moving the latter along the valve seat axis 26 between a position (FIGURE 2) adjacent the valve seat 18, wherein the valve ball 20 engages the seat to block fluid flow in the direction 16 through the passage 14, and a position (FIGURE 5) remote from the valve seat, wherein the ball is retracted from the seat to permit flow in the latter direction through the passage.

Figure 2:
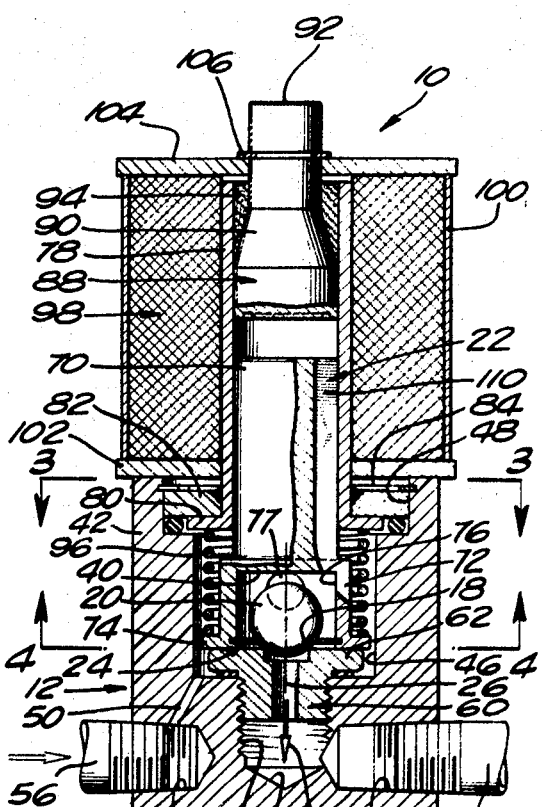
FIGURE 2 is an enlarged axial section through the valve, taken on line 2—2 in FIGURE 1, illustrating the valve in its normally closed condition.
Figure 5:
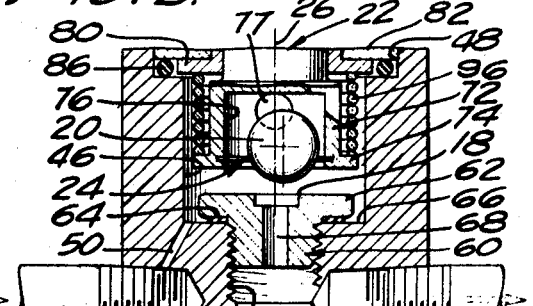
FIGURE 5 is a fragmentary section similar to the lower portion of FIGURE 2, showing the valve in its open condition.

The arrangement and construction of the valve 10 is such that during movement of the valve lifter 22 from its position of FIGURE 2 to its position of FIGURE 5, the thrust shoulder 24 on the lifter exerts on the valve ball 20 an unseating force F (FIGURE 10) which is directed along a line of action 30 inclined at an acute angle relative to the valve seat axis 26 in such a way that the force has a component $Fp$ parallel to the axis which is effective to lift the adjacent side of the ball axially from the valve seat 18 and a component $Fn$ normal to the axis which is effective to roll the ball laterally from the valve seat. As a consequence, the ball initially separates from its seat at one side only while the opposite side of the ball remains in contact with the seat, as shown in FIG. 10, and the force required to unseat the ball against any given fluid pressure is substantially reduced.

In the particular ball valve 10 shown in the drawings, the valve ball lifter 22 comprises a cage containing the valve ball 20 in such a way that the ball is capable of limited floating movement relative to the cage. The illustrated cage, for example, is effectively a sleeve which contains the ball and is movable longitudinally in the valve passage 14 between the position of FIG. 2 and the position of FIG. 5. For convenience in the ensuing description, the cage position illustrated in FIG. 2 is hereinafter referred to as its closed position, and the cage position illustrated in FIG. 5 is hereinafter referred to as its open position. Positioned in an internal circumferential groove 34 within the forward end of the cage, i.e., the end adjacent the valve seat 18, is a snap ring 36 having enlargements 38 at its ends. These enlargements project inwardly beyond the inner surface of the sleeve and together constitute the valve lifter thrust shoulder 24. The opposite end of the sleeve is closed by an end wall 40. The internal diameter of the cage 22 is substantially greater than the diameter of the valve ball 20. On the other hand, in the plane of the snap ring 36, the cage has an effective minor internal dimension, measured diametrically of the cage sleeve between the snap ring enlargements 38 and the opposing inner snap ring edge, which is slightly less than the valve ball diameter. Thus, the valve ball is captivated within the cage for endwise floating movement relative to the cage between a forward limiting position of contact with the snap ring 36 and a rear limiting position of engagement with the cage end wall 40. The minor internal dimension, just referred to, of the cage is such that when the cage occupies its closed position of FIG. 2, the valve ball can protrude sufficiently beyond the forward end of the cage to engage its seat 18 and thereby block fluid flow in the direction 16 through the valve passage 14. Movement of the cage to its open position of FIG. 5 by the valve operating means 28 retracts the ball out of engagement with the seat to permit fluid flow in the latter direction through the passage.

As noted earlier, a major feature of the invention resides in the asymmetrical configuration of the thrust shoulder 24 on the ball cage 22. In this regard, it will be observed, particularly in FIG. 10, that the thrust shoulder is displaced to one side of and engages the valve ball 20 in offset or eccentric relation to the valve seat axis 26, during movement of the cage to its open position to unseat the ball. Because of this eccentric position of the thrust shoulder and the curvature of the valve ball 20 at its zone of contact with the thrust shoulder, the unseating force exerted on the ball during movement of the cage to its open position is directed along the oblique line of action 30. The thrust shoulder thus effectively lifts and rolls the valve ball axially and laterally from its valve seat 18 in such manner that the ball initially separates from the seat at one side only, while the opposite side of the ball remains in contact with the seat, as mentioned above. The force required to unseat the ball at any given fluid pressure is thereby materially reduced.

Referring now in more detail to the particular ball valve of the invention which has been selected for illustration in FIGURES 1 through 5, the valve housing 12 comprises a generally cylindrical metal body 42. Extending axially into the rear end of the valve body 42 is a bore defining a forward threaded socket 44, an intermediate cylindrical chamber 46, and a rear counterbore 48. Valve chamber 46 communicates, through a passage 50, to an internally threaded inlet 52 in the forward end of the valve body. The valve body socket 44 communicates to an internally threaded outlet 54 in the valve body, diametrically opposite the inlet. The inlet and outlet are adapted for threaded connection to conduits 56 and 58, respectively, for conveying pressure fluid to and from the valve. Threaded in the valve body socket 44 is a valve seat insert 60 having an external circumferential flange 62 within the valve chamber 46. A gasket or seal ring 64 is compressed between the insert flange 62 and the adjacent forward annular end wall 66 of the valve chamber 46 to seal the valve seat insert to the valve body. Extending axially through the valve seat insert is a passage 68, the end of which adjacent the valve chamber 46 is counterbored to define the valve seat 18. It is now evident, therefore, that when the valve ball 20 occupies its open position of FIG. 5, fluid flow through the valve occurs from the valve inlet 52 through the passage 50, chamber 46, valve seat insert passage 68, socket 14, to the valve outlet 54. When the valve ball occupies its closed position of FIG. 2, fluid pressure in the valve chamber 46 retains the ball in sealing contact with its valve seat 18.

The valve cage 22 of the illustrated ball valve has a generally cylindrical body which is externally stepped to a larger diameter in the direction of its forward end to provide the cage with a rear cylindrical extremity 70, an intermediate cylindrical portion 72, and an annular shoulder 74 about the forward end of the cylindrical portion. The valve ball 20 is positioned within a bore 76 which extends axially into the forward end of the cylindrical cage body and through its intermediate cylindrical portion 72. This cylindrical cage portion defines, in effect, a sleeve in which the ball is confined by the snap ring 36, as noted earlier, and has a port 77 communicating to the valve chamber 46.

The rear cylindrical extremity 70 of the ball cage 22 slides within a sleeve 78, the forward end of which is turned outwardly to form an external annular shoulder 80. Surrounding and welded to the sleeve 78, in seating contact with the rear face of the sleeve shoulder 80, is a ring 82. Ring 82 fits closely within the counterbore 48 in the rear end of the valve body 42 and is secured releasably in the counterbore by a snap ring 84. A seal ring 86 is compressed between the sleeve ring 82 and the forward annular wall of the counterbore 48, as shown, to effectively seal the sleeve 78 to the valve body 42. Positioned within the rear end of the sleeve 78 is a plug 88 having an intermediate tapered portion 90 and a rear cylindrical extension 92. The plug extension 92 extends a distance rearwardly beyond the rear end of the sleeve 78, as shown. Plug 88 is secured and sealed to the sleeve 78 by silver solder 94, or the like, which fills the annular gap existing between the sleeve and the tapered portion 90 and rear cylindrical extremity 92 of the plug. The axial spacing between the rear face of the valve seat insert 60 and the front face of the plug 88 is sufficiently greater than the overall length of the valve ball cage 22 to accommodate axial movement of the cage between its closed position of FIGURE 2 and its open position of FIGURE 5.

The particular ball valve 10 under consideration is a normally closed valve. To this end, the valve is equipped with a coil compression spring 96 for yieldably urging the valve cage 22 to its closed position of FIGURE 2. Spring 96 surrounds the forward end of the valve cage between and seats against the forward shoulder 74 on the cage and the forward shoulder 80 on the sleeve 78. When in its closed position, the forward end of the valve cage seats against the rear face of the valve seat insert 60, as shown.

The valve operating means 28 are effective to move the valve cage 22 rearwardly to its open position of FIGURE 5 against the action of the spring 96 and the fluid pressure active on the valve ball 20. The operating means 28 of the illustrated ball valve comprise a solenoid, the plunger of which is provided by the rear cylindrical extremity 70 on the valve cage. The solenoid coil 98 is contained within a cylindrical housing sleeve 100 and fits slideably over the rear extending end of the valve sleeve 78. The valve cage 22, plug 88, solenoid housing sleeve 100, and washers 102, 104 are constructed of a magnetically permeable material. All of the valve parts except the cage 22 are constructed of non-magnetically permeable materials. Surrounding the valve sleeve 78 between the valve housing 42 and the coil housing 100 is a washer 102. A second washer 104 fits slideably over the rear extending extremity 92 of the valve sleeve plug 88 and seats against the rear annular face of the coil housing 100. The coil housing is releasably secured in position on the valve sleeve 78 by a snap ring 106 which fits within a groove in the plug extremity 92 and seats against the rear face of the washer 104. The terminals 108 of the solenoid coil 98 extend through an opening in the coil housing 100 for connection to a source of energizing current, as shown in FIGURE 1.

The operation of the illustrated solenoid ball valve 10 is believed to be obvious from the preceding description. Thus, assuming the valve inlet 52 to be connected to a source of fluid under pressure and the solenoid coil 98 to be de-energized, the valve lifter or cage 22 occupies its closed position of FIGURE 2. In this position, the valve ball 20 is retained in seating contact with its valve seat 18 by the fluid pressure in the valve chamber 46, thus to block fluid flow from the inlet to the valve outlet 54. When the solenoid coil 98 is energized, a magnetic force is exerted on the rear cylindrical extremity or plunger 70 of the valve cage which urges the cage rearwardly to its open position of FIGURE 5. During initial rearward movement of the valve cage, the enlarged ends 38 of the cage snap ring 36, which together constitute the valve-ball-lifting thrust shoulder 24, engage the valve ball 20 at one side of the valve seat axis 26 to produce on the ball combined axial lifting and lateral rolling forces, the resultant of which, i.e., force F in FIGURE 10, is directed along the oblique line of action 30. This oblique unseating force F on the vave ball 20 initially lifts one side of the ball axially and simultaneously cams or rolls the ball laterally from its vave seat 18 in such a way that the ball initially separates from its seat at one side only, while the opposite side of the ball remains in contact with the seat, as indicated in broken lines in FIG. 10. The force required to thus initially crack or unseat the valve ball against fluid pressure in the valve chamber 46 is thus materially reduced. After the valve ball 20 has been cammed laterally to its lateral limiting position indicated in broken lines in FIG. 10, wherein the ball engages the valve cage snap ring 36 diametrically opposite the enlarged snap ring ends 38 and the ball is laterally displaced from the valve seat axis 26, continued unseating or opening movement of the valve ball with the rearwardly retracting valve cage 22 to their open positions of FIG. 5 occurs parallel to this axis. The valve ball and cage remain in their open positions of FIG. 5 until the solenoid coil 98 is again de-energized, whereupon the cage and ball are returned to their closed positions of FIG. 2 by the valve spring 96. In order to prevent the entrapment of fluid between the rear end of the valve cage 22 and the plug 88, which would inhibit or prevent opening of the valve, the cage is axially slotted at 110 to provide a communicating passage between the space at the rear of the cage and the valve chamber 46 through which fluid may circulate from the space to the chamber during opening of the valve and from the chamber to the space during closing of the valve.

Reference is now made to FIGURES 6 through 9 which illustrate a normally open solenoid ball valve 10a, according to the invention. The normally open valve 10a is identical, in many respects, to the normally closed valve, just described. Accordingly, the normally open valve will be described only in sufficient detail to point out the differences between this valve and the normally closed valve. Moreover like parts of the valve are designated by the same reference numerals.

With the above discussion in mind, the illustrated normally open ball valve 10a of the invention comprises a valve body 42 having an inlet 52 and an outlet 54 which communicate through a passage 50 and a chamber 46 in the body and a passage 68 in the valve seat insert 60 of the valve. Fixed within the rear end of the valve body 42 is a sleeve 78, on the rear extending end of which is removably mounted the valve operating solenoid winding 98 and its containing sleeve housing 100.

Axially movable within the valve housing 42 and the valve sleeve 98 is a valve ball cage 22a having a rear cylindrical extremity 70a, a forward cylindrical or sleeve portion 72a, and an intermediate annular shoulder 74a. Positioned within the forward sleeve portion 72a of the cage is a valve ball 20 which is confined in the cage by a snap ring 36 positioned within an internal groove within the forward end of the sleeve portion. This snap ring has enlarged ends 38 which define a ball lifting thrust shoulder 24. Slideably fitted on the rear cage extremity 70a, and slideable within the sleeve 78, is a sleeve 112a, having a forward external annular shoulder 114a which seats forwardly against the intermediate valve cage shoulder 74a when the valve is open. The shoulder 114a on the sleeve 112a projects radially over the forward annular end wall of the counterbore 48 in the valve body 42, whereby the sleeve is capable of only limited endwise floating movement.

The sleeve 112a is so axially dimensioned that when this sleeve occupies its rear limiting position of FIGURE 6, a substantial space exists between the rear end of the sleeve and the plug 88a which seals the rear end of the valve sleeve 78. Contained within this space, for endwise floating movement in the space between a rear limiting position of contact with the plug 88a and a forward limiting position of contact with the sleeve 112a, is a magnetically permeable solenoid plunger 116a. The rear extremity 70a of the valve cage 22a is axially dimensioned to protrude a distance beyond the rear end of the sleeve 112a, into contact with the plunger 116a, when the cage occupies its open position of FIGURE 6. The cage is normally retained in this open position by a coil compression spring 96 which surrounds the forward sleeve portion 72a of the cage and seats at its ends against the cage shoulder 74a and the forward annular wall 66 of the valve chamber 46. In the normally open ball valve under consideration, the solenoid housing sleeve 100, washers 102, 104, valve cage guide sleeve 112a, and plunger 116a are constructed of a magnetically permeable material. All other parts of the valve are constructed of a non-magnetically permeable material.

The operation of the normally open valve 10a is believed to be obvious from the preceding description. Thus, when the solenoid winding 98 is de-energized, the valve spring 96 retains the valve cage 22a and the valve ball 20 therein, in their open positions of FIGURE 6. In these positions fluid entering the valve through its inlet 52 may flow through the valve passage 50, chamber 46, and the valve seat insert passage 68 to the valve outlet 54. Energizing of the winding 98 produces a forward magnetic force on the solenoid plunger 116a which urges the plunger forwardly against the rear protruding extremity 70a of the valve cage 22a and thereby urges the valve cage, and the valve ball 20, to their closed positions of FIG. 9. In this closed position of the valve ball, the latter engages its valve seat 18 to block fluid flow through the valve, from the valve inlet 52 to the valve outlet 54. When the solenoid winding is again de-energized, the valve cage 22 is returned rearwardly to its open position of FIG. 6 by the valve spring 96. During this rearward opening movement of the cage, the valve ball lifting thrust shoulder 24 engages the valve ball 20 at one side of the valve seat axis to produce on the ball a resultant oblique unseating force (F in FIG. 10) which simultaneously lifts the ball axially and rolls the ball laterally from its seat, in the same manner as explained earlier with regard to the normally closed valve of the invention. The force required to open the valve against pressure is thereby substantially reduced. The sleeve 112a of the normally open valve 10a has an axial slot 110a which permits fluid to circulate back and forth between the rear side of the sleeve and the valve chamber 46 during opening and closing of the valve, thus to prevent entrapment of fluid at the rear of the sleeve which would inhibit or prevent opening and closing movement of the valve cage.

At this point, it is obvious that the improvement features of the invention are concerned with utilization of the ball valve as a shutoff valve involving opening and closing of the valve by the valve operating means 28. A unique feature of the invention, however, resides in the fact that the present valve, when closed, is inherently capable of serving as a check valve which will permit flow in one direction, but block flow in the reverse direction through the valve, but may be opened, when desired, to permit flow in the reverse direction through the valve. When a present valve is employed for such check valve operation, the valve inlet and outlet are reversed. That is to say, the valve port 54 serves as the inlet and the valve port 52 serves as the outlet. Under these conditions the valve ball 20 will unseat to permit fluid flow from the valve inlet 54 to the valve outlet 52 but will automatically seat to prevent reverse flow from the outlet to the inlet. At any time, however, that the outlet pressure exceeds the inlet pressure, the valve operating means 28 may be actuated to unseat the valve ball and thereby permit reverse flow through the valve from the outlet to the inlet.

It is now obvious, therefore, that the invention herein described and illustrated is fully capable of attaining the several objects and advantages preliminarily set forth.

What is claimed is:

1. A valve comprising a housing having a chamber therein with inlet and outlet port means communicating with said chamber, said outlet port means having a circular valve seat, a sustantially spherical ball having a diameter larger than said valve seat and adapted when resting on said seat to close the valve and when held away from the seat to open the valve, a valve lifter comprising a cage member surrounding said ball and mounted in said chamber for movement toward and away from said valve seat, said cage member having an internal groove, located in the region adjacent said ball and said valve seat, a snap ring mounted in said internal groove and being of sufficient width to project radially inward and prevent escape of said ball from said cage, said snap ring having a substantially uniform outside diameter but having on the inside diameter thereof at least one projection which engages said ball when said cage is moved away from said seat to tilt the ball away from the seat, thereby cracking the valve and facilitating full opening of the valve as the entire ball is moved further away from the valve seat.

2. Valve in accordance with claim 1, including means for moving said cage away from said valve seat and means for moving said cage toward said valve seat, one of said means comprising a spring bias, the other of said means comprising a solenoid coil.

3. A valve housing comprising:

a housing having a fluid passage for conducting fluid in a given direction of flow through said passage and an annular valve seat about said passage facing upstream relative to said flow direction, a valve ball in said passage upstream of said valve seat and having a diameter greater than the diameter of said seat, whereby fluid flow in said direction through said passage urges said ball towards a position of seating engagement with said valve seat, a valve lifter movable longitudinally in said passage upstream of said valve seat including a cage containing said ball and an asymmetrical ball lifting thrust shoulder comprising an internal shoulder in said cage and located between said ball and valve seat at one side of the axis of said seat, said cage including a sleeve having an internal diameter greater than the diameter of said valve ball and a minor internal dimension in the plane of said thrust shoulder less than said ball diameter, and said sleeve having an internal circumferential groove at the end thereof adjacent said valve seat, and a snap ring in said groove having enlargements at its ends which project inwardly beyond the inner surface of said sleeve and define said thrust shoulder, operating means for moving said valve lifter along said axis between a closed position adjacent said valve seat, wherein said valve ball engages said seat to block fluid in said direction through said passage, and an open position remote from said seat, wherein said ball is spaced from said seat to permit fluid flow in said direction through said passage, and said thrust shoulder being effective during movement of said valve lifter from said closed position to said open position to exert on said valve ball an unseating force directed along a line of action and inclined at an acute angle relative to said valve seat axis, whereby said unseating force is effective to unseat said ball with a combined axial lifting and lateral rolling motion which initially separates said ball from said seat at one side only while the opposite side of the ball remains in contact with the seat thereby to reduce the magnitude of force required to unseat the ball against given fluid pressure.

4. A valve according to claim 3 wherein said operating means comprise a solenoid having a plunger for moving said valve lifter to one of its positions in response to energizing of said solenoid, and releasing said valve lifter for movement to its other position upon de-energizing of said solenoid, said operating means further comprising a spring for urging said valve lifter to said other position.

5. The valve according to claim 4 wherein said spring urges said valve lifter to its closed position and said solenoid urges said valve lifter to its open position.

6. A valve comprising:
a housing having a fluid passage for conducting fluid in a given direction of flow through said passage and an annular valve seat about said passage facing upstream relative to said flow direction,
a valve ball in said passage upstream of said valve seat and having a diameter greater than the diameter of said seat, whereby fluid flow in said direction through said passage urges said ball toward a position of seating engagement with said valve seat,
a valve lifter movable longitudinally in said passage upstream of said valve seat including an asymmetrical valve ball lifting thrust shoulder located between said ball and valve seat at one side of the axis of said seat,
opeating means for moving said valve lifter along said axis between a closed position adjacent said valve seat, wherein said valve ball engages said seat to block fluid flow in said direction through said passage, and an open position remote from said seat, wherein said ball is spaced from said seat to permit fluid flow in said direction through said passage,
said operating means comprising a solenoid having a plunger for moving said valve lifter to its closed position in response to energizing of said solenoid and releasing said valve lifter for movement to its open position upon de-energizing of said solenoid, and a spring for urging said valve lifter to its open position, and
said thrust shoulder being effective during movement of said valve lifter from said closed position to said open position to exert on said valve ball an unseating force directed along a line of action and inclined at an acuate angle relative to said valve seat axis, whereby said unseating force is effective to unseat said ball with a combined axial lifting and lateral rolling motion which initially separates said ball from said seat at one side only while the opposite side of the ball remains in contact with the seat, thereby to reduce the magnitude of the force required to unseat the ball against given fluid pressure.

7. A valve housing:
a housing having a fluid passage for conducting fluid in a given direction of flow through said passage and an annular valve seat about said passage facing upstream relative to said flow direction,
a valve ball in said passage upstream of said valve seat and having a diameter greater than the diameter of said seat, whereby fluid flow in said direction through said passage urges said ball toward a position of seating engagement with said valve seat,
a valve lifter movable longitudinally in said passage upstream of said valve seat including an asymmetrical valve ball lifting thrust shoulder located between said ball and valve seat at one side of the axis of said seat,
operating means for moving said valve lifter along said axis between a closed position adjacent said valve seat, wherein said valve ball engages said seat to block fluid flow in said direction through said passage, and an open position remote from said seat, wherein said ball is spaced from said seat to permit fluid flow in said direction through said passage,
said thrust shoulder being effective during movement of said valve lifter from said closed position to said open position to exert on said valve ball an unseating force directed along a line of action and inclined at an acute angle relative to said valve seat axis, whereby said unseating force is effective to unseat said ball with a combined axial lifting and lateral rolling motion which initially separates said ball from said seat at one side only while the opposite side of the ball remains in contact with the seat, thereby to reduce the magnitude of the force required to unseat the ball against given fluid pressure,
said housing comprising a cylindrical body containing a chamber having an open end opening axially through one end of said body,
said valve seat is concentrically disposed at the opposite end of and faces into said chamber,
said passage has an inlet communicating with said chamber upstream of said valve seat and an outlet communicating with said chamber through said valve seat,
said valve lifter comprises a cage movable in said chamber axially of said valve seat and including a forward sleeeve portion opening axially toward said valve seat and containing said valve ball,
said thrust shoulder comprises an internal shoulder within the forward end of said sleeve portion, and
said operating means comprise a rearwardly extending sleeve coaxially sealed to the rear end of said housing, a solenoid coil surrounding said sleeve, a magnetically permeable solenoid plunger movable axially in said sleeve and operably associated with said cage in such manner that energizing of said coil produces on said plunger a magnetic force for urging said cage toward one position thereof, and a spring acting between said cage and valve body for urging said cage toward its other position.

8. A valve according to claim 7 wherein:
said plunger comprises a rear cylindrical extremity of said cage, said magnetic force is effective to urge said cage towards its open position, and said spring urges said cage towards its closed position.

9. The combination according to claim 7 wherein said cage includes a sleeve having an internal diameter greater than the diameter of said ball.

10. A valve comprising:
a housing having a fluid passage for conducting fluid in a given direction of flow through said passage and an anuular valve seat about said passage facing upstream realtive to said flow direction,
a valve ball in said passage upstream of said valve seat and having a diameter greater than the diameter of said seat, whereby fluid flow in said direction through said passage urges said ball toward a position of seating engagement with said valve seat,
a valve lifter movable longitudinally in said passage upstream of said valve seat including an asymmetrical valve ball lifting thrust shoulder located between said ball and valve seat at one side of the axis of said seat,
operating means for moving said valve lifter along said axis between a closed position adjacent said valve seat, wherein said valve ball engages said seat to block fluid flow in said direction through said passage, and an open position remote from said seat, wherein said ball is spaced from said seat to permit fluid flow in said direction through said passage,
said thrust shoulder being effective during movement of said valve lifter from said closed position to said open position to exert on said valve ball an unseating force directed along a line of action and inclined at an acute angle relative to said valve seat axis, whereby said unseating force is effective to unseat said ball with a combined axial lifting and lateral rolling motion which initially separates said ball from said seat at one side only while the opposite side of the ball remains in contact with the seat, thereby to reduce the magnitude of the force required to unseat the ball against given fluid pressure, said housing comprising a cylindrical body containing a chamber having an open end opening axially through one end of said body, said valve seat is concentrically disposed at the opposite end of and faces into said chamber, said passage has an inlet communicating with said chamber upstream of said valve seat and an outlet communicating with said chamber through said valve seat, said valve lifter comprises a cage movable in said chamber axially of said valve seat and including a forward sleeve portion opening axially toward said valve seat and containing said valve ball, said thrust shoulder comprises an internal shoulder within the forward end of said sleeve portion, and said operating means comprise a rearwardly extending sleeve coaxially sealed to the rear end of said housing, a solenoid coil surrounding said sleeve, a magnetically permeable solenoid plunger movable axially in said sleeve and operably associated with said cage in such manner that energizing of said coil produces on said plunger a magnetic force for urging said cage toward its closed position, and a spring acting between said cage and valve body for urging said cage toward its open position.

References Cited

UNITED STATES PATENTS

| | | |
|---|---|---|
| 1,097,416 | 5/1914 | Fraser. |
| 1,409,127 | 3/1923 | Wasem. |
| 1,693,676 | 12/1928 | Spinelle. |
| 2,069,069 | 1/1937 | Horton _____ 251—77 |
| 2,196,503 | 4/1940 | McFee. |

HENRY T. KLINKSIEK, Primary Examiner

U.S. Cl. X.R.

251—77, 129, 158, 215